United States Patent [19]
Scott

[11] Patent Number: 5,425,203
[45] Date of Patent: Jun. 20, 1995

[54] APPARATUS FOR SUPPORTING PLANTS

[76] Inventor: James H. Scott, 2114 Club Lake Ct., San Angelo, Tex. 76901

[21] Appl. No.: 80,069

[22] Filed: Jun. 18, 1993

[51] Int. Cl.6 .............................................. A01G 9/12
[52] U.S. Cl. ........................................ 47/70; 47/47; 403/171
[58] Field of Search ................. 47/70, 45 C, 44 R, 47; 248/298, 295.1; 403/171

[56] References Cited

U.S. PATENT DOCUMENTS

| | | | |
|---|---|---|---|
| H824 | 10/1990 | Ghafoorzai | 47/70 |
| 796,214 | 8/1905 | Hughes . | |
| 1,227,105 | 5/1917 | Barnes . | |
| 1,903,122 | 3/1933 | Merz | 47/45 C |
| 1,973,536 | 9/1934 | Mack | 403/171 |
| 2,058,934 | 6/1935 | Yohe | 47/38 |
| 3,165,863 | 1/1965 | Duran | 47/47 |
| 3,342,457 | 9/1967 | Bobrowski | 403/174 |
| 3,386,590 | 6/1968 | Gretz | 403/171 |
| 3,554,473 | 1/1971 | Rakov et al. | 248/44 |
| 4,074,461 | 2/1978 | Hirschman | 47/70 |
| 4,386,480 | 6/1983 | Horowitz | 47/45 |
| 4,869,040 | 9/1989 | Howell | 52/633 |

FOREIGN PATENT DOCUMENTS

| | | | |
|---|---|---|---|
| 223423 | 2/1962 | Austria | 47/45 C |
| 1197380 | 12/1985 | Canada | 47/70 |
| 2519513 | 7/1983 | France | 47/70 |

*Primary Examiner*—Henry E. Raduazo
*Attorney, Agent, or Firm*—Baker & Botts

[57] ABSTRACT

An apparatus (10) for supporting plants includes a base plate (12) having a vertical channel (14) and a plurality of horizontal channels (16), (18), (20), and (22). A vertical rod (32) extends into and above the ground through the vertical channel (14). A plurality of horizontal rods (36) within each horizontal channel (16), (18), (20), and (22) extends a support base provided by the base plate (12). An end plate (38) connects to each horizontal rod (36) to allow for attachment to nearby structures for further support.

12 Claims, 2 Drawing Sheets

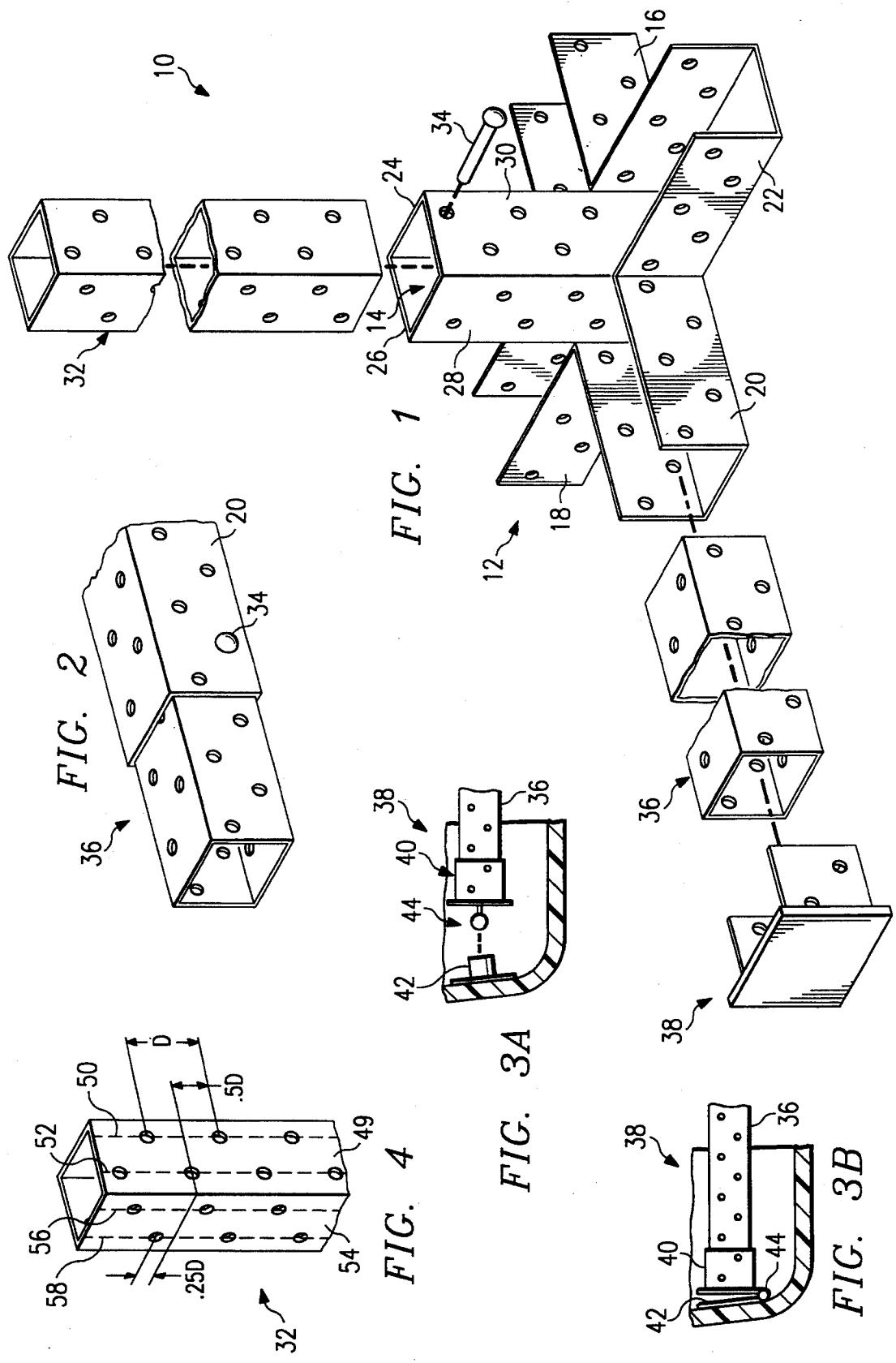

APPARATUS FOR SUPPORTING PLANTS

TECHNICAL FIELD OF THE INVENTION

The present invention relates in general to plant growth techniques and more particularly to an apparatus for supporting plants.

BACKGROUND OF THE INVENTION

Many plants have the tendency to grow in nonvertical directions when vertical growth is desired. To assist plants in growing vertically, many devices employ a vertical mast upon which the plant can grow. However, these devices are unstable when the weight of the plant due to nonvertical growth is too great for the vertical mast to support. It is therefore desirable to have an apparatus that can support the weight of the plant during growth.

From the foregoing, it may be appreciated that a need has arisen for an apparatus that can support vertical growth of plants. A need has also arisen for an apparatus that provides stability and support for increasing plant weight and plant growth in nonvertical directions.

SUMMARY OF THE INVENTION

In accordance with the present invention, an apparatus for supporting plants is provided which substantially eliminates or reduces disadvantages and problems associated with conventional plant support devices.

According to an embodiment of the present invention, there is provided an apparatus for supporting plants that includes a base plate having a vertical channel and a plurality of horizontal channels. A vertical rod passes through the base plate and within the vertical channel to provide vertical support for plant growth. Each horizontal channel has a horizontal rod to increase the stability of the base plate and structural support for the apparatus.

The apparatus of the present invention provides various technical advantages over conventional plant support devices. For example, one technical advantage is increased support for vertical plant growth. Another technical advantage is in using an expandable base plate to provide structural support and overcome the tendency of plants to grow in nonvertical directions. Other technical advantages are readily apparent to one skilled in the art from the following figures, descriptions, and claims.

BRIEF DESCRIPTION OF THE DRAWINGS

For a more complete understanding of the present invention and the advantages thereof, reference is now made to the following description taken in conjunction with the accompanying drawings, wherein like reference numerals represent like parts, in which:

FIG. 1 illustrates a diagram of an apparatus for supporting plants;

FIG. 2 illustrates a diagram of a telescopically adjustable horizontal rod;

FIGS. 3A–B illustrate a diagram of an end plate assembly for the apparatus;

FIG. 4 illustrates a diagram of aperture spacing for the horizontal and vertical rods of the apparatus;

DETAILED DESCRIPTION OF THE INVENTION

Figure 5A:
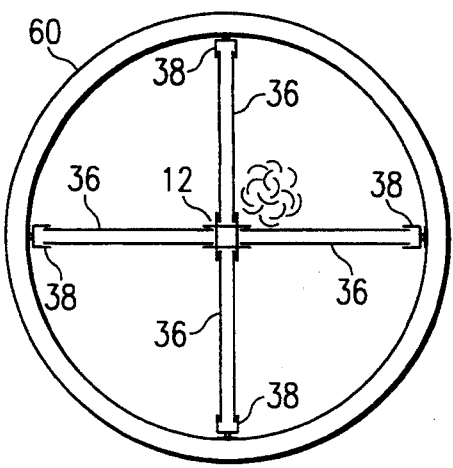
FIGS. 5A–D illustrate possible placement of the apparatus within a plant container.
Figure 5B:
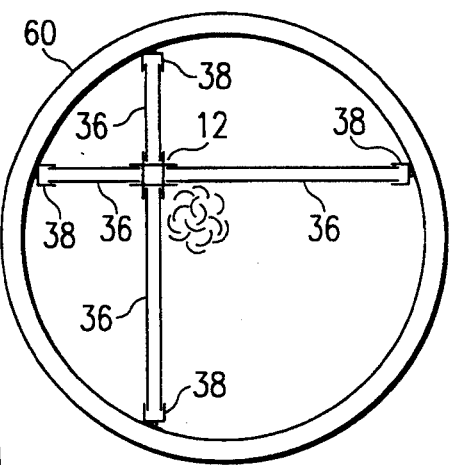

FIG. 1 is a diagram of an apparatus 10 for supporting plants. Apparatus 10 includes a base plate 12 having a vertical channel 14 and four horizontal channels 16, 18, 20, and 22. Though shown with four horizontal channels, base plate 12 may have any number of horizontal channels. Vertical channel 14 is enclosed by walls 24, 26, 28, and 30 wherein each wall has a plurality of apertures therethrough. Vertical channel 14 receives a hollow vertical rod 32 having a plurality of apertures therethrough corresponding to the apertures within side walls 24, 26, 28, and 30 of vertical channel 14. A plurality of pins 34 are used to secure vertical rod 32 within vertical channel 14. Each horizontal channel 16, 18, 20, and 22 has sidewalls with a plurality of apertures therethrough. Though not shown, horizontal channels 16, 18, 20, and 22 may be similarly surrounded by side walls as vertical channel 14. Hollow horizontal rods 36, having apertures corresponding to the apertures within each sidewall, lay within each horizontal channel 16, 18, 20, and 22. Each horizontal rod 36 may be identical to vertical rod 32. A plurality of pins 34 are used to secure each horizontal rod 36 within each horizontal channel 16, 18, 20, and 22. End plates 38, having apertures corresponding to the apertures of horizontal rods 36, connect to each horizontal rod 36 by a plurality of pins 34 and attaches to a specific structure such as an inside of a container or a stake.

In use, vertical rod 32 extends a predetermined distance into soil in a vicinity of a plant and extends a predetermined distance above the soil, through vertical channel 14 of base plate 12. Pins 34 secure vertical rod 32 within vertical channel 14. Base plate 12 can be placed on the soil or buried a predetermined distance below the surface of the soil. Horizontal rods 36 having unique predetermined lengths are placed within each horizontal channel 16, 18, 20, and 22. Horizontal rods 36 can be cut to the desired length or be telescopically adjustable to a desired position. FIG. 2 shows a telescopically adjustable horizontal rod 36 or vertical rod 32 for use in apparatus 10. Pins 34 secure each horizontal rod 36 at an appropriate telescopic length. Pins 34 further secure each horizontal rod 36 within each horizontal channel 16, 18, 20, and 22. Each end plate 38 also attaches to each horizontal rod 36 by pins 34. Each end plate 38 may then be used to connect to a structure near a location of base plate 12.

FIGS. 3A–B are a diagrams of end plate 38. End plate 38 includes an end plate channel 40 and an end piece 42. End plate channel 40 has a plurality of apertures corresponding to apertures within each horizontal rod 36 such that pins 34 can be used to attach end plate 38 to horizontal rod 36. End piece 42 may have a pivot connection 44 to end plate channel 40. Pivot connection 44 between end piece 42 and end plate channel 40 may be accomplished by a ball and socket configuration as shown in FIG. 3A or through a hinge type assembly as shown in FIG. 3B. End piece 42 may have an adhesive backing to allow end piece 42 to attach to a structure within the vicinity of base plate 12 at an appropriate angle as determined by pivot connection 44. Pivot connection 44 facilitates placement of end plate 38 at various acute angles in order to provide maximum support upon adherence to a nearby structure such as an interior wall of a container holding a plant or a stake in a field environment.

FIG. 4 is a diagram of vertical rod 32 and the positioning of apertures therethrough. Though described in conjunction with vertical rod 32, the aperture positioning may equally apply to each horizontal rod 36. Each surface of vertical rod 32 has two columns of apertures extending the entire length of vertical rod 32. The apertures within each column are spaced a distance D from each adjacent aperture within the corresponding column. Apertures between columns on the same surface are spaced a distance 0.5 D from adjacent apertures on a separate column. Apertures between opposing surfaces are aligned to allow pin 34 to pass through both opposing surfaces. Apertures of a column within an adjacent surface are spaced 0.25 D from corresponding holes of corresponding columns in an adjacent surface.

For example, on East surface 49 (and an opposing West surface), column 50 has apertures spaced a distance D from each other and column 52 has apertures spaced a distance D from each other but offset a distance 0.5 D from adjacent apertures in column 50. North surface 54 (and an opposing South surface) has a column 56 with apertures spaced a distance D from each other and a column 58 with apertures spaced a distance D from each other but offset by a distance 0.5 D from adjacent apertures in column 56. Further, apertures in column 58 of North surface 54 are offset a distance of 0.25 D from corresponding apertures in column 52 of East surface 49. Similarly, apertures in column 56 of North surface 54 are offset a distance 0.25 D from corresponding apertures in column 50 of East surface 49.

By offsetting the apertures as described above, an increase in integral strength can be provided as compared to a single row of holes without any offset between adjacent surfaces. This concept provides additional strength to horizontal rods 36, serves to provide more strength to base plate 12, and allows for the sizing of horizontal rods 36 to the nearest 0.25 D by simply rotating horizontal rod 36. The apertures within each vertical rod 32 and horizontal rods 36 also provide areas within which a plant can latch onto during growth. Vertical channel 14, horizontal channels 16, 18, 20, and 22, and end plate 38 have aperture positions corresponding to the aperture positions of vertical rod 32 and horizontal rods 36 to allow pins 34 to pass through each properly aligned surface.

FIGS. 5A-D depict diagrams showing the flexibility and positioning of base plate 12 within a container 60. Base plate 12 is positioned in the vicinity of a plant 62 and vertical rod 32 and horizontal rods 36 are placed in base plate 12 as desired. The length of horizontal rods 36 are determined based on the position of base plate 12 within container 60 such that end plate 38 can adhere to the interior of container 60. As shown in FIGS. 5A-D, the length of horizontal rod 36 within each horizontal channel is adjusted according to a desired position of base plate 12 within container 60. The flexibility of apparatus 10 allows for support to be given to a plant no matter where it may be located.

Figure 6A:
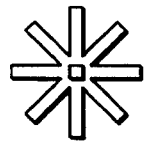
FIGS. 6A–B illustrate alternate configurations of a base plate of the apparatus.
Figure 5C:
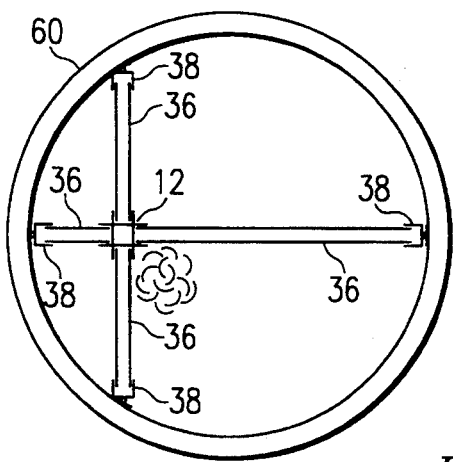
Figure 5D:
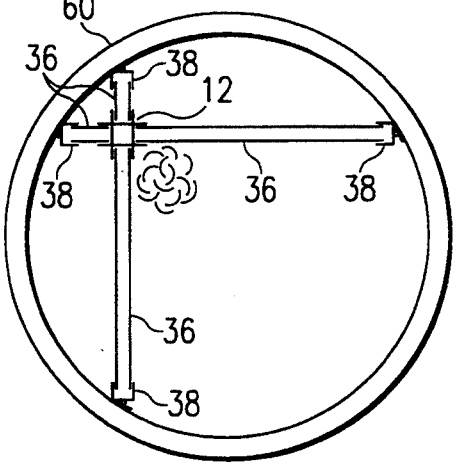
Figure 6B:
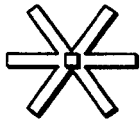

FIGS. 6A-B depict different configurations for base plate 12. Base plate 12 has been described as having four horizontal channels but further support may be provided through the use of additional horizontal channels. FIG. 6A employs a base plate 12 having eight horizontal channels while FIG. 6B shows a base plate having a six horizontal channel configuration. The use of an increasing amount of horizontal channels serves two primary purposes. The first is to allow more flexibility in installing horizontal rods in order to achieve more acute intersections of the horizontal rods with the interior surface of a container. The second purpose is to provide additional resistance to deviations from the vertical by providing more surface material on the bottom of the horizontal portion of the base plate and any extensions thereof.

Figure 7A:
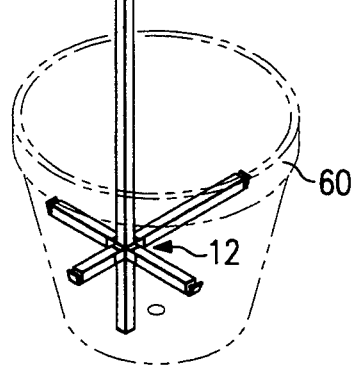
FIGS. 7A–B illustrate formation of the apparatus into a trellis configuration.
Figure 7B:
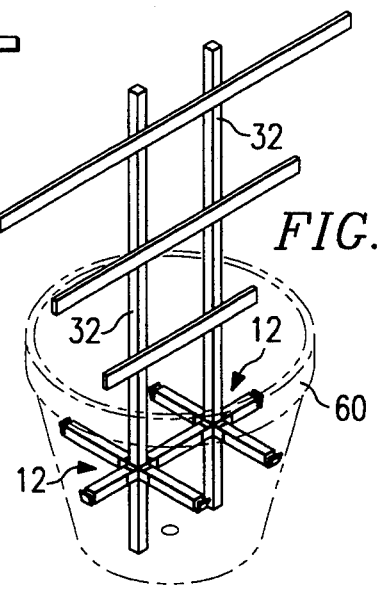

FIGS. 7A-B depict a trellis configuration for apparatus 10. FIG. 7A shows apparatus 10 with base plate 12 and vertical rod 32 in a standard configuration within container 60. FIG. 7B shows a trellis arrangement constructed from two base plate 12 assemblies each having a vertical rod 32. The trellis configuration allows for the support of multiple plants along both a vertical and horizontal support structure.

In summary, an apparatus for supporting plant growth includes a base plate having a vertical channel and a plurality of horizontal channels. A vertical rod extends through the vertical channel and attaches to the base plate by a plurality of pins. Horizontal rods are attached by pins within each horizontal channel to extend the support base for the apparatus. An end plate may attach to each horizontal rod and connect to a structure near a location of the base plate to provide additional support.

Thus, it is apparent that there has been provided, in accordance with the present invention, an apparatus for supporting a plant that satisfies the advantages set forth above. Although the preferred embodiment has been described in detail, it should be understood that various changes, substitutions, and alterations can be made herein without departing from the spirit and scope of the present invention as defined by the following claims.

What is claimed is:

1. An apparatus for supporting plants, comprising:
   a base plate having a vertical channel and a plurality of horizontal channels;
   a vertical rod passing through said base plate and within said vertical channel to provide vertical support for plant growth;
   a horizontal rod laying within each of said horizontal channels to provide horizontal support for plant growth;
   a pin connecting said vertical rod to said vertical channel, said vertical rod and said vertical channel having a plurality of apertures therethrough such that said pin passes through an aperture of said vertical channel and an aperture of said vertical rod,
   wherein said vertical rod and said vertical channel each have first, second, third, and fourth sides, said first side being opposite said third side and said second side being opposite said fourth side, said apertures formed into a first column and a second column on each of said first, second, third, and fourth sides of said vertical rod and said vertical channel and spaced equidistantly within each column, said apertures aligned such that said pin passes through an aperture of each opposing side, said apertures in said first column aligned half of said equidistance between adjacent apertures in said second column, said apertures of said first and second columns of said first side aligned one-fourth said equidistance from apertures in said first and second columns of said second side.

2. An apparatus for supporting plants, comprising:
a base plate having a vertical channel and a plurality of horizontal channels;
a vertical rod passing through said base plate and within said vertical channel to provide vertical support for plant growth;
a horizontal rod laying within each of said horizontal channels to provide horizontal support for plant growth; and
an end plate attached to each horizontal rod for connecting the apparatus to a plurality of adjacent structures,
wherein each end plate is attached to each adjacent structure by an adhesive material.

3. The apparatus of claim 2, wherein each end plate pivots with respect to each horizontal rod for controlling an angle of placement of each end plate in relation to each horizontal rod and said adjacent structures.

4. The apparatus of claim 3, wherein each end plate pivots on a hinge assembly.

5. The apparatus of claim 3, wherein each end plate pivots on a ball and socket joint.

6. An apparatus for supporting plants, comprising:
a base plate having a vertical channel and a plurality of horizontal channels extending from said vertical channel, wherein said vertical channel and said horizontal channels are defined by sidewalls, each sidewall having a plurality of apertures therethrough;
a vertical rod passing through said base plate within said vertical channel for providing vertical support of plant growth, said vertical rod having a plurality of apertures therethrough, wherein said vertical rod and said vertical channel each have first, second, third, and fourth sidewalls, said first sidewall being opposite said third sidewall and said second sidewall being opposite said fourth sidewall, said apertures formed into a first column and a second column on each of said first, second, third, and fourth sidewalls and spaced equidistantly within each column, said apertures in said first column aligned half of said equidistance between adjacent apertures in said second column, said apertures of said first and second columns of said first sidewall aligned one-fourth said equidistance from apertures in said first and second columns of said second sidewall;
a horizontal rod within each horizontal channel for providing a foundation support of plant growth, each horizontal rod having a same aperture configuration as said vertical rod, each horizontal rod having an adjustable length;
a plurality of pins within said apertures for securing said vertical rod to said vertical channel and each horizontal rod to each horizontal channel.

7. The apparatus of claim 6, further comprising:
an end plate assembly connected to each horizontal rod by said pins for securing the apparatus to a structure near said base plate.

8. The apparatus of claim 7, wherein each end plate assembly has an end plate channel connected to each horizontal rod and an end piece pivotally connected to said end plate channel.

9. The apparatus of claim 8, wherein said end piece pivots by a hinge mechanism.

10. The apparatus of claim 8, wherein said end piece pivots on a ball and socket joint.

11. The apparatus of claim 8, further comprising:
an adhesive material on said end piece for securing said end piece to said structure.

12. The apparatus of claim 6, wherein said vertical rod has an adjustable length.

* * * * *